United States Patent [19]

Schroeder et al.

[11] Patent Number: 5,607,186
[45] Date of Patent: Mar. 4, 1997

[54] SURVEY APPARATUS

[76] Inventors: Michael J. Schroeder; Paul N. Stavropoulos, both of 8959 W. Cermak Rd., Riverside, Ill. 60546

[21] Appl. No.: 427,266

[22] Filed: Apr. 24, 1995

[51] Int. Cl.$^6$ .................................................. B42D 15/00
[52] U.S. Cl. .......................... 283/65; 283/117; 116/323; 40/491
[58] Field of Search .......................... 283/65, 116, 117; 33/563, 562; 434/353, 358, 362, 306; 235/51, 50 R, 70 R, 70 A; D10/64; 116/323, 321, 224; 40/488, 491

[56] References Cited

U.S. PATENT DOCUMENTS

| | | | |
|---|---|---|---|
| 3,034,708 | 5/1962 | Bean, Jr. | 235/70 R X |
| 3,402,694 | 9/1968 | Christman | 40/488 X |
| 3,596,390 | 8/1971 | Scalice | 40/491 |
| 4,132,348 | 1/1979 | Bromberg | 235/70 R |
| 4,233,768 | 11/1980 | Bromberg | 235/70 R X |
| 4,262,939 | 4/1981 | Schoettle, Jr. | 235/70 R X |
| 4,454,410 | 6/1984 | Merl | 235/70 R X |

Primary Examiner—Frances Han
Attorney, Agent, or Firm—Rodger H. Flagg

[57] ABSTRACT

A survey card apparatus having a front planar member with a plurality of elongated apertures, and a response aperture perpendicular to at least a portion of the plurality of elongated apertures. A middle planar member is secured to the front planar member. The middle planar member has at least one aperture therethrough. A plurality of slide members with indicia responsive to selected questions on the front side and bar code indicia on the back side. The indicia on the front side of the respective slide members is aligned with the response aperture on the front planar member. A rear panel member is secured to the middle planar member. The rear panel member has a bar code indicia aperture in parallel alignment with the response aperture, so that when the indicia is aligned with regard to the response aperture, the response in bar code is aligned with the bar code aperture on the rear planar member. A transparent film is secured to the front planar member, with a first opening to receive a removable question portion therein. A second opening may be provided in the transparent film to receive a removable rating indicator therein.

21 Claims, 3 Drawing Sheets

SURVEY APPARATUS

BACKGROUND OF THE INVENTION

Surveys have been used for many years to determine the opinions of a selected audience. The audience may be selected from a group of people at random, or selected by predetermined characteristics, such as age, race, political preference, sex, physical characteristics, economic status, education, vocation, etc.

It is often helpful to survey a group of people gathered together, such as during a seminar, sales meeting, convention, etc., to obtain their opinions regarding a selected set of questions. This is often regarded as a "Questionaire", where the group to be surveyed fills in the blanks or marks a series of boxes, according to their response to a variety of questions such as "Did you find the seminar 'not useful', 'somewhat useful', 'very useful' or 'extremely useful'." "Rate the speaker: 'not knowledgeable', 'somewhat knowledgeable', 'knowledgeable', 'very knowledgeable'.

The selected questions can range from a simple "yes" or "no", to rating a selected response on a scale from "one through ten", etc.

The problem with current survey technology, is the difficulty of obtaining the results promptly. One means currently in use is "manual grading", another technique is the use of "punch cards", or the use of "lead pencils", or "masks". Such techniques rarely provide a comprehensive response minutes of completing the survey, particularly where a survey of 100 or more people is involved.

SUMMARY OF THE INVENTION

The present invention takes advantage of "bar code" technology, to quickly scan the answers which have been coded on a "survey card". The user's response may be recorded on their individual survey card during the presentation, while their attention span is still focused, and their opinions are still fresh in their minds. Alternately, the user may quickly record their response upon completion of the presentation.

The user's response is recorded by sliding a marker to the desired response. The marker is conveniently located in proximity to the specific survey questions. The survey cards may then be passed to the end of each row, or collected as the participants leave the seminar. The survey cards are collected and quickly scanned by a conventional bar code reader. In this way, the results of the survey are promptly tallied, and the combined response may be promptly disclosed to the participants, while the seminar is still in progress. The Survey card may also be used in classrooms, and other small groups where a prompt survey is needed or desired.

BRIEF DESCRIPTION OF THE DRAWINGS

The above mentioned and other features and objects of this invention and the manner of attaining them will become more apparent and the invention itself will be best understood by reference to the following description of the invention, when considered in conjunction with the accompanying drawings, wherein.

DESCRIPTION OF THE PREFERRED EMBODIMENT

Figure 1:
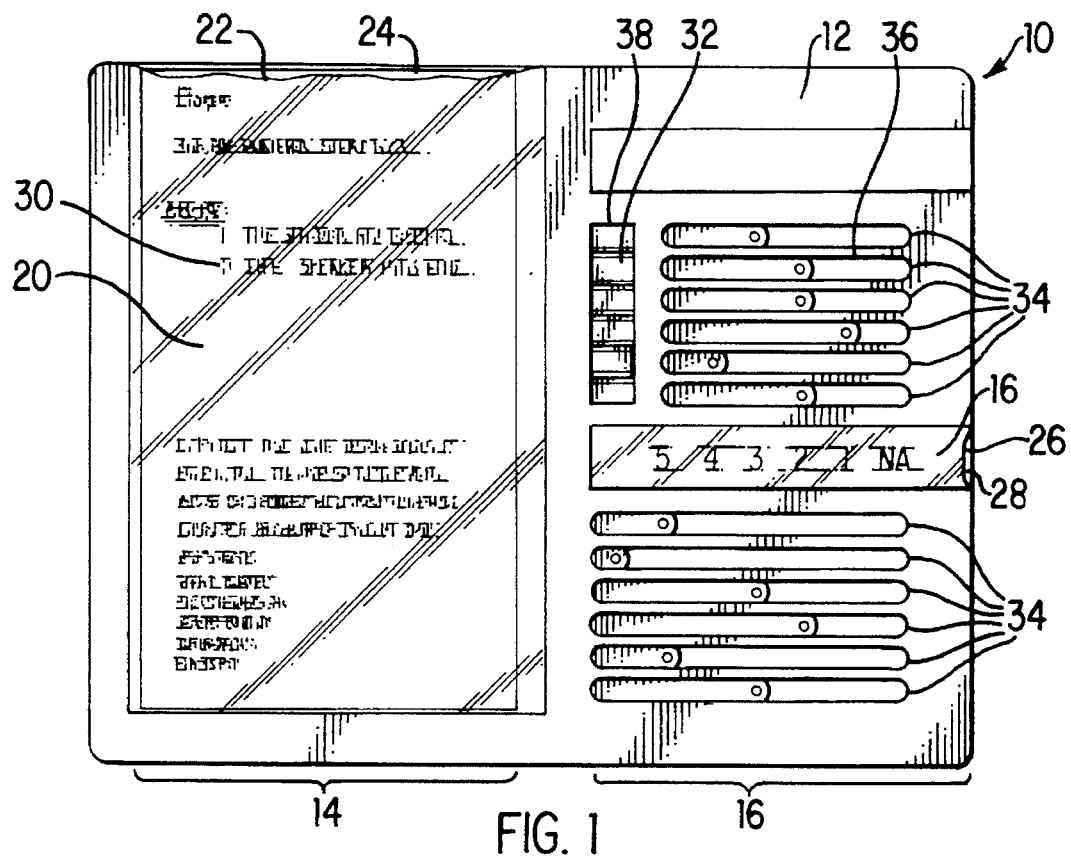
FIG. 1 is a view of the front side of the Survey card, showing the questions with a slide response for each question.
Figure 2:
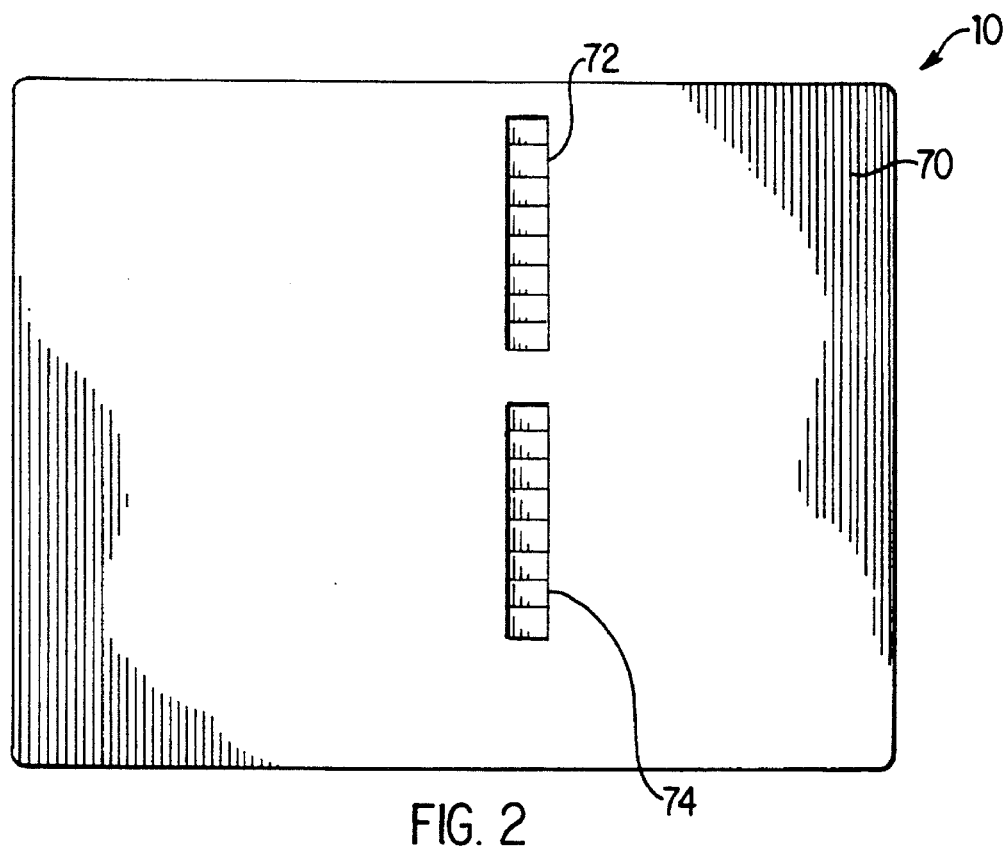
FIG. 2 is a view of the back side of the survey card, showing the bar code access representing the user's response to each question.

As shown in perspective in FIG. 1, the Survey Card 10 of the present invention comprises a front side 12 having a removable question portion 14 and a slidable response portion 16 disposed thereon. A transparent film 20 is secured to the front side 12 of the survey card 10, with an opening 22 provided to receive removable questions 24 therein. A second opening 26 is also provided in the transparent film 20 to receive a removable rating indicator 28 therein.

The removable questions 24 and removable rating indicator 28 are protected by the transparent film 20 during use, and thus, are reusable for multiple sessions, etc. When the nature of the session changes, the survey card 10 may also be easily changed by changing the removable questions 24 to suit the session changes.

Likewise, the removable rating indicator 28 may also be changed as needed to be responsive to the removable questions 24. This survey card 10 may thus be adapted for use with simple "yes" "no" answers, or to multiple choice answers, or to rating systems, such as rating selected questions on a scale from one-to-ten, one-to-five, etc. This survey card 10 is also able to provide a combination of responses, depending upon the type of selected question 30 asked, and the type of selected response 32 sought.

Figure 3:
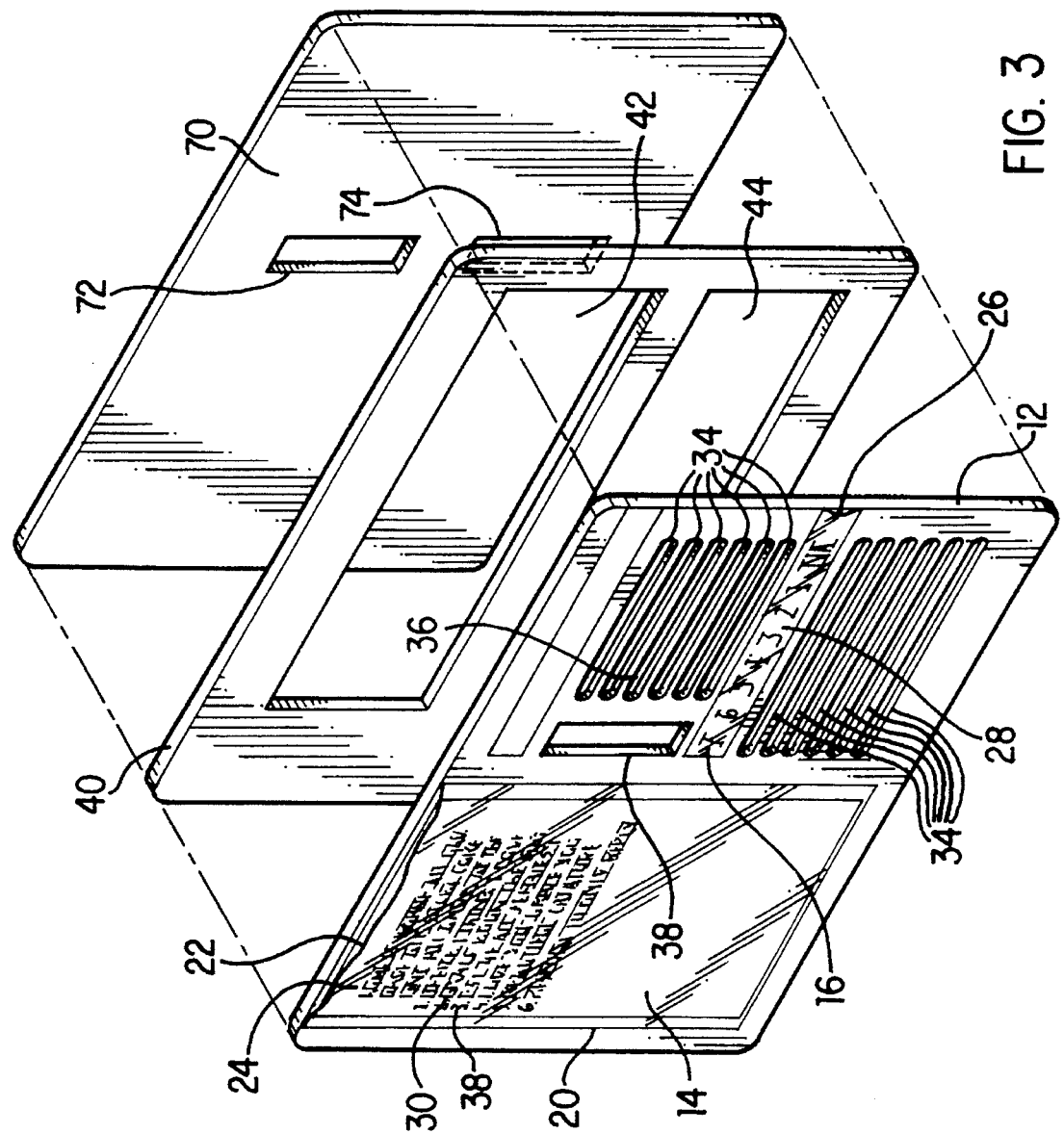
FIG. 3 is an exploded perspective view of the survey card, showing several layers.
Figure 4:
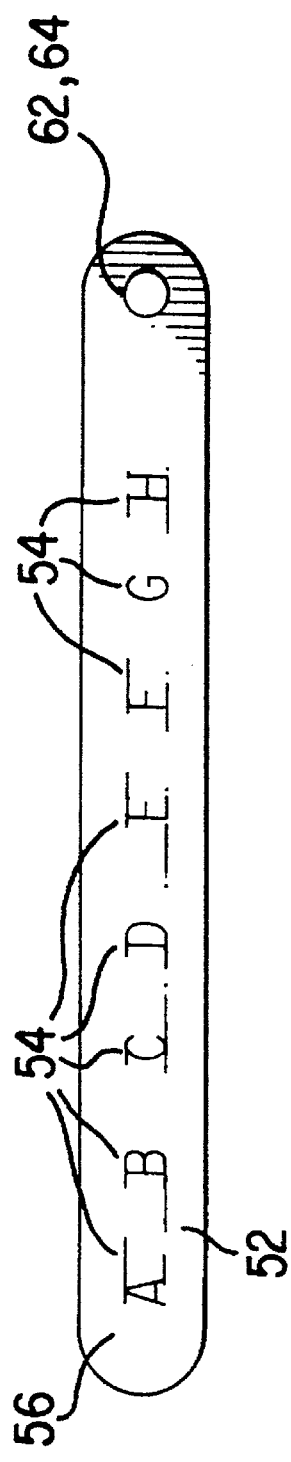
FIG. 4 is a perspective view of the front side of a selected slide member, showing response indicia thereon.
Figure 5:
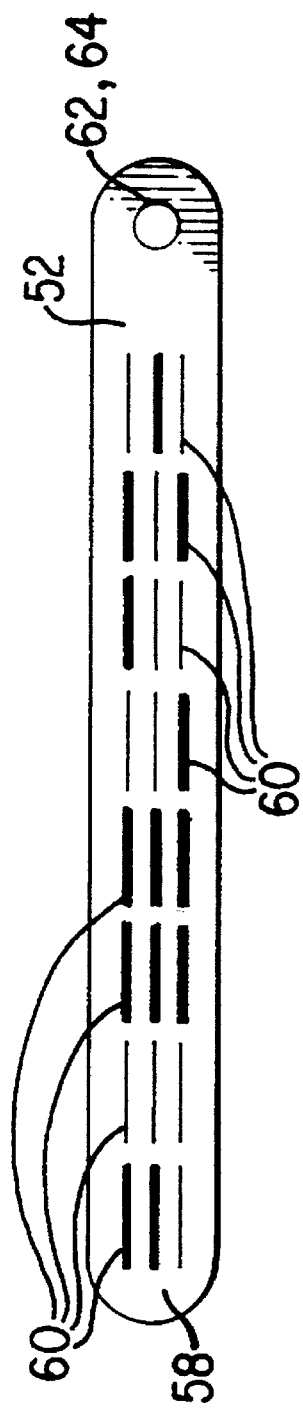
FIG. 5 is a view of the back side of a selected slide member, showing bar code indicia disposed in spaced relation thereon.

The front side 12 has a plurality of elongated apertures 34 extending therethrough. Each selected aperture 36 is aligned with a selected question 30, for ease of response. Alternately, indicia 38 may be used to identify specific questions, and their respective selective response. While numerals are shown in FIG. 3, any other indicia may be used, such as letters or symbols or colors, or combinations of these.

The middle portion 40 comprises a spacing element having at least one aperture 42, 44 therethrough. The apertures 42, 44 are sized to receive a plurality of slide members 50 therein, and to allow a selected slide member 52 to selectively move a desired response indicia 54 into position beneath the response aperture 38 in the front planar member 12.

The rear planar member 70 preferably has at least one back aperture 72, 74 vertically disposed therein. The back aperture(s) are positioned to align with complimentary bar code indicia 60 located on the back side of the selected slide member 52. When the user selects a response 32 to a selected question 30 by moving a selected slide member 52 to position the response indicia 54 on the front side 56 of the slide member 50, the corresponding bar code indicia 60 is positioned in alignment with the back aperture 72, 74.

Thus, all of the user responses may be quickly scanned with an existing bar code reader (not shown) to tally the user responses.

Bar code indicia 60 may be any scanable bar code indicia. While a combination of three heavy and/or thin lines are shown in FIG. 6, one skilled in the bar code art may readily substitute any known combination of bar code indicia without departing from the spirit of this invention, or from the scope of the following claims.

A plurality of slide members 50 are positioned beneath a plurality of apertures 34 adjacent to the removable question portion 14.

A selected slide member 50 may be moved towards or away from the removable question portion 14 to selectively position a selected slide members 50 to indicate the selected response 32 to a selected question 30

A positioning means 62 is accessible through the selected aperture 36 to enable the user to manually move the selected slide member 52 towards and away from the selected question 30 to position the selected response 32 in the desired position. The positioning means 62 may be a raised portion 64 which at least partially extends within a selected aperture 36, or the positioning means 62 may be a positioning aperture 64 disposed in the selected slide member 52 to receive a protruding implement (not shown), such as the tip of a pencil or pen, to selectively bias the selected slide member 52 towards and away from the removable question portion 14.

Thus, the user may quickly and easily align the desired response indicia 54 to indicate the desired response to each selected question 30. Alternately, movement of a selected slide member 52 selectively positions the desired response indicia 54 in alignment with a removable response portion 16. Each selected slide member 52 has desired response indicia 54 disposed in spaced relation on the front side 56 of the slide member 52, and bar code indicia 60 disposed in spaced relation upon the back side 58 of the selected slide member 52. The desired response indicia 54 on the front side 56 of the selected slide member 52 is selectively aligned with either the selected response aperture 38, or the removable rating indicator 28. The bar code indicia 60 on the back side 58 of the selected slide member 52 is spaced to align with the bar code apertures 72, 74 to display the desired user response to each selected question 30.

The bar code indicia 76 visible through the bar code aperture 72, 74 may be easily scanned by a conventional bar code reader (not shown), to quickly tally a plurality of user responses to selected questions 30. Alternately, the bar code apertures 72, 74 may extend through the front planar member 12, for scanning from the front side, where the bar code indicia 60 is placed on the front side 56 of the selected slide member 52 and positioned to align with the bar code apertures 72, 74, when the response indicia 54 is also aligned with the selected response aperture 38 or the rating indicator 28.

In this way the user may quickly and easily respond to each question located within the removable question portion 14 with a selected response 32 from a series of desired response indicia 54.

In use, the survey card 10 may be quickly and easily modified to suit any number of selected questions 30, by replacing the removable question portion 14 and/or the removable response portion 16. A plurality of survey cards 10 may be passed out to a selected group, and their responses duly recorded on the survey card 10 by selectively positioning the response indicia 54 within the response aperture 38 on the front planar member 12. As a result, bar code indicia 60 is also positioned within the bar code aperture(s) 72, 74.

Upon completion of the survey, the survey card 10 may be passed to the isles by each member of the selected group, and each survey card 10 promptly scanned by one read stroke of a remote bar code reader to determine the results of the survey. Alternately, the user cards may be collected as each member of the selected group leaves, and the collected survey cards 10 may then be promptly scanned to obtain the survey results.

Selected indicia 34, such as the name, location, date and time of the seminar, the name and address of the manufacturer of the Survey Card 10 may also be conveniently displayed on the front face 12 of the Survey card 10.

The survey card 10 is preferably made of inexpensive materials, such as heavy paper stock, plastic sheet or film, aluminum or other metal sheet stock, molded materials, etc. Individual layers 40 may be secured together by any conventional means, such as gluing, sonic welding, thermal bonding, mechanical fasteners, etc.

Once assembled, the survey card 10 may be repeatably used, without further modification. Where a change in questions and type of responses is sought, the removable question portion 14 and removable response portion 16 may be replaced, and the new data collected will reflect the questions asked and the type of responses given by the users.

The rear planar member 70 and middle planar member 40 may be molded as one piece, the plurality of slide members 50 inserted in apertures 42, 44, and the front planar member 12 secured thereto by conventional means. Likewise, the front planar member 12 and the middle planar member 40 may be molded as one piece, the plurality of slide members 50 inserted in apertures 42, 44, and the rear planar member secured thereto by conventional means.

As shown in FIG. 3, the front planar member 12, middle planar member 40 and rear planar member 70 may be separate pieces, which are secured together at assembly, to suit manufacturing preference.

The quantity and position of the respective apertures 34, 36, 38, 42, 44, 72, 74 may be varied to suit manufacturing and design preference, providing there is sufficient room for the plurality of sliding members 50 to move sufficiently to position the desired response indicia 54 and the bar code indicia 76 in their respective positions in relation to the removable question portion 14 and the removable response portion 16.

The survey card may be modified so that the bar code aperture located on the back side of the planar survey card is offset both vertically and horizontally to orient the survey card for ease of scanning. Other modifications to allow for ease of scanning of the survey card include cutting off a corner of the survey card or indicia on the survey card to orient the survey card to position the survey card in a scanning direction.

Thus, while the Survey Card of the present invention has been fully disclosed and described herein, numerous modifications will become apparent to one of ordinary skill in this art, and such modifications and adaptations are intended to be included within the scope of the following claims:

What is claimed is:

1. A survey card apparatus, comprising:
   a) a front planar member having a plurality of elongated apertures disposed therein, with a response aperture disposed perpendicular to at least a portion of the plurality of elongated apertures;
   b) a middle planar member secured to the front planar member, the middle planar member having at least one aperture therethrough;
   c) a plurality of slide members each having a front side and a back side, the plurality of slide members slidably received within an aperture in the middle planar member and aligned with the plurality of elongated apertures in the front planar member, each selected one of the plurality of slide members having indicia responsive to a selected question on the front side, and bar code indicia on the back side in alignment with the indicia responsive to a selected question on the front side;

d) a rear planar member secured to the middle planar member, the rear planar member having at least one aperture parallel to the response aperture in the front planar member, wherein a selected one of the plurality of slide members is slidably positioned through a selected elongated aperture to align selected bar code indicia within the aperture in the rear planar member, and a plurality of user responses may be subsequently scanned with one read stroke of a remote bar code reader by passing the bar code reader along the bar code aperture disposed on the rear planar member.

2. The survey card apparatus of claim 1, wherein a transparent film is secured to the front planar member, and a first opening is provided in the transparent film to receive a removable question portion between a portion of the transparent film and the front planar member.

3. The survey card apparatus of claim 2, wherein a second opening is provided in the transparent film to receive a removable rating indicator between a portion of the transparent film and the front planar member.

4. The survey card apparatus of claim 1, wherein the indicia on the front side of at least one selected slide member is a series of numbers.

5. The survey card apparatus of claim 1, wherein the indicia on the front side of at least one selected slide member is a series of letters.

6. The survey card apparatus of claim 1, wherein the indicia on the front side of at least one selected slide member is a series of colors.

7. The survey card apparatus of claim 1, wherein the indicia on the front side of at least one selected slide member is a series of symbols.

8. The survey card apparatus of claim 1, wherein each of the bar code symbols on the back side of the slide member comprises a selected combination of horizontally disposed, parallel thick lines and thin lines.

9. The survey card apparatus of claim 1, wherein each of the plurality of slide members has a positioning means in alignment with a respective elongated aperture in the front planar member, for ease of slidably moving the slide member to position the selected indicia on the front side of the slide member in alignment with the response aperture in the front planar member.

10. The survey card apparatus of claim 1, wherein the bar code aperture on the back side of the planar survey card is offset both vertically and horizontally to orient the survey card for ease of scanning.

11. The survey card apparatus of claim 1, wherein a corner of the survey card is cut off to orient the survey card for ease of scanning.

12. The survey card apparatus of claim 1, wherein indicia is used on the survey card to orient the survey card for ease of scanning.

13. The survey card apparatus of claim 1, wherein the front planar member, the middle planar member and the rear planar member are each made of heavy paper materials.

14. The survey card apparatus of claim 1, wherein the bar code aperture is located on the front planar side of the survey card apparatus in parallel alignment with the response apertures, and both the response indicia and the bar code indicia are located on the front side of the plurality of slide members in a manner to align a selected bar code in the bar code aperture when a selected indicia responsive to a selected question is aligned in the response aperture, and the selected bar code indicia positioned in the bar code aperture is scanned with a remote bar code scanner from the front side of the survey card apparatus.

15. A survey card apparatus, which comprises:

a) a front planar member having a plurality of elongated apertures disposed therein, with a response aperture disposed perpendicular to at least a portion of the plurality of elongated apertures, the front planar member further having a transparent film secured to the front planar member, the transparent film having a first opening to receive a removable question portion between the transparent film and the front planar member;

b) a middle planar member secured to the front planar member, the middle planar member having at least one aperture therethrough;

c) a plurality of slide members each having a front side and a back side, the plurality of slide members slidably received with an aperture in the middle planar member and aligned with the plurality of elongated apertures in the front planar member, each selected one of the plurality of slide members having indicia responsive to a selected question on the front side, and bar code indicia on the back side in alignment with the indicia responsive to a selected question on the front side;

d) a rear planar member secured to the middle planar member, the rear planar member having at least one aperture parallel to the response aperture in the front planar member, wherein a selected one of the plurality of slide members is slidably positioned through a selected elongated aperture to align selected bar code indicia within the aperture in the rear planar member, and a plurality of user responses may be subsequently scanned with one read stroke of a remote bar code reader by passing the bar code reader along the bar code aperture disposed on the rear planar member.

16. The survey card apparatus of claim 15, wherein a second opening is provided in the transparent film to receive a removable rating indicator between a portion of the transparent film and the front planar member.

17. The survey card apparatus of claim 15, wherein the front planar member, the middle planar member and the rear planar member are each made of heavy paper material.

18. A survey card apparatus, which comprises:

a) a front planar member having a plurality of elongated apertures disposed therein, with a response aperture disposed perpendicular to at least a portion of the plurality of elongated apertures, said front planar member further having a transparent film secured to the front planar member, the transparent film having a first opening to receive a removable question portion between a first portion of the transparent film and the front planar member, and a second opening to receive a removable rating indicator between a second portion of the transparent film and the front planar member;

b) a middle planar member secured to the front planar member, the middle planar member having at least one aperture therethrough;

c) a plurality of slide members each having a front side and a back side, the plurality of slide members slidably received within an aperture in the middle planar member and aligned with the plurality of elongated apertures in the front planar member, each selected one of the plurality of slide members having indicia responsive to a selected question on the front side, and bar code indicia on the back side in alignment with the indicia responsive to a selected question on the front side;

d) a rear planar member secured to the middle planar member, the rear planar member having at least one aperture parallel to the response aperture in the front planar member, wherein a selected one of the plurality of slide members is slidably positioned through a selected elongated aperture to align selected bar code indicia within the aperture in the rear planar member, and a plurality of user responses by be subsequently scanned with a remote bar code scanner by passing the bar code scanner along the bar code aperture in the rear planar member.

19. The survey card apparatus of claim 18, wherein the bar code aperture on the back side of the planar survey card is offset both vertically and horizontally to orient the survey card for ease of scanning.

20. The survey card apparatus of claim 18, wherein each of the plurality of slide members has a positioning means in alignment with a respective elongated aperture in the front planar member, for ease of slidably moving the slide member to position the selected indicia on the front side of the slide member in alignment with the response aperture in the front planar member.

21. The survey card apparatus of claim 18, wherein the front planar member, the middle planar member and the rear planar member are each made of heavy paper material.

* * * * *